US010997092B2

(12) United States Patent
Sahu et al.

(10) Patent No.: US 10,997,092 B2
(45) Date of Patent: May 4, 2021

(54) ENABLING OUT-OF-BAND HARDWARE MANAGEMENT VIA AN IN-BAND COMMUNICATIONS CHANNEL

(71) Applicant: Seagate Technology LLC, Cupertino, CA (US)

(72) Inventors: Rakesh Kumar Sahu, Pune (IN); Manish Gajjaria, Pune (IN); Svalbard Colaco, Margao (IN)

(73) Assignee: Seagate Technology LLC, Fremont, CA (US)

( * ) Notice: Subject to any disclaimer, the term of this patent is extended or adjusted under 35 U.S.C. 154(b) by 292 days.

(21) Appl. No.: 15/991,031

(22) Filed: May 29, 2018

(65) Prior Publication Data

US 2019/0050351 A1  Feb. 14, 2019

Related U.S. Application Data

(60) Provisional application No. 62/543,729, filed on Aug. 10, 2017.

(51) Int. Cl.
*G06F 13/10* (2006.01)
*G06F 13/38* (2006.01)
*G06F 3/06* (2006.01)

(52) U.S. Cl.
CPC .......... *G06F 13/105* (2013.01); *G06F 3/0604* (2013.01); *G06F 3/0653* (2013.01); *G06F 3/0659* (2013.01); *G06F 3/0673* (2013.01); *G06F 13/387* (2013.01)

(58) Field of Classification Search
CPC .... G06F 13/105; G06F 13/387; G06F 3/0659; G06F 3/0604; G06F 3/0653; G06F 3/0673

USPC .......................................................... 710/62
See application file for complete search history.

(56) References Cited

U.S. PATENT DOCUMENTS

| 7,313,685 | B2 | 12/2007 | Broyles, III et al. |
| 7,484,084 | B1 | 1/2009 | Ranaweera et al. |
| 8,219,713 | B2 | 7/2012 | Shah et al. |
| 2003/0154281 | A1 | 8/2003 | Mitsuoka et al. |
| 2006/0143209 | A1* | 6/2006 | Zimmer ................. G06F 8/656 |

(Continued)

OTHER PUBLICATIONS

Distributed Management Task Force, Inc., "System Management BIOS (SMBIOS) Reference Specification", Jan. 12, 2017, pp. 1-149.

*Primary Examiner* — Zachary K Huson
*Assistant Examiner* — Brooke J Taylor
(74) *Attorney, Agent, or Firm* — Mueting Raasch Group

(57) ABSTRACT

An apparatus includes a host and a baseboard. An out-of-band request is received via a host network interface of the host. The baseboard includes a management controller operating independently of the host and coupled to a management network interface separate from the host network interface. The out-of-band request is sent via an in-band communications channel from a proxy server of the host to a management agent running on the management controller microprocessor. Management data is formatted via the management agent. The management data is sent to the proxy server via the in-band communications channel. The management data describes hardware status that is obtained via the management controller in response to the out-of-band request. The management data is sent from the host network interface in response to the out-of-band request.

20 Claims, 10 Drawing Sheets

(56) References Cited

U.S. PATENT DOCUMENTS

| | | |
|---|---|---|
| 2009/0164690 A1 | 6/2009 | Slaight |
| 2011/0283006 A1 | 11/2011 | Ramamurthy |
| 2018/0145955 A1* | 5/2018 | Nirwal .................. H04L 9/0894 |
| 2019/0004826 A1* | 1/2019 | Ryan ........................ G06F 13/20 |
| 2019/0004901 A1* | 1/2019 | Ryan ................... G06F 11/1441 |

* cited by examiner

```
Schema_1
{
  "Name":"HyperThreadSettings",
  "Help String":"Intel HyperThreading
      allows for Multithreaded Software
      Applications",
  "Current value":"1",
  "Attribute":"Drop Down",
  "Option":"2"
  "Disabled":"1"
  "Enabled":"0"
  "IsVariableModifiedbyUI":"0"
}
```

*FIG. 12*

```
Schema_2
{
  "GlobalConfigVersion": "1",
  "RepoVersion":"1",
  "PasswordProtectionStatus":"1",
  "TotalBiosVars":"90",
  "ModifiedVariableCount":"10",
  "VersionString":"BIOS Settings
      DataBase",
  "PasswordHash":"abdsldjeiehfdhjsksk",
  "PasswordHashDirty":"0""
}
```

*FIG. 13*

ENABLING OUT-OF-BAND HARDWARE MANAGEMENT VIA AN IN-BAND COMMUNICATIONS CHANNEL

CROSS REFERENCE TO RELATED APPLICATIONS

This application claims priority and benefit to U.S. Provisional Patent Application No. 62/543,729, filed on Aug. 10, 2017, which is incorporated herein by reference in its entirety.

SUMMARY

The present disclosure is directed to hardware management systems. In one embodiment, an out-of-band request is received via a host network interface of a host operable on an apparatus. The apparatus includes a plurality of peripheral devices coupled to a baseboard. The baseboard includes a management controller operating independently of the host and coupled to a management network interface separate from the host network interface. The out-of-band request is sent via an in-band communications channel from a proxy server of the host to a management agent running on the management controller microprocessor. Management data is formatted via the management agent. The management data is sent to the proxy server via the in-band communications channel. The management data describes hardware status that is obtained via the management controller in response to the out-of-band request. The management data is sent from the host network interface in response to the out-of-band request.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

FIGS. 12 and 13 are diagrams of firmware configuration schema according to example embodiments.

DETAILED DESCRIPTION

The present disclosure relates to large-scale server systems, e.g., storage servers. In currently evolving rack-scale, server-based designs, scalability is achieved through a large quantity of servers laid out horizontally. The servers can be managed using in-band communications, which are communications between server components within a single enclosure (e.g., a host of the server communicating to management controller of the server over keyboard controller style or KCS, interface). The host generally refers to the CPU(s) and operating system(s) that perform server operations such as data storage services, Web services, distributed computation services, etc. Out-of-band communications relate to the sending of management data outside of the enclosure, e.g., via a network, via a management controller that operates independently of the host. The management controller allows a remote management terminal to monitor and control aspects of the host's operations whether the host is operating or not. The out-of-band communications between the remote management terminal and the management controller may occur over the same network used by the host, or by a different network.

In some implementations, for in-band management, the SCSI Enclosure Services (SES) interface has been used, and for out-of-band management, the Intelligent Platform Management Interface (IPMI) interface has been used. For some larger-scale designs, the traditional methods of server management, using SES or IPMI are proving to be insufficient. For example, providing separate network interface hardware for both the host and the management controller can increase power consumption as well as increasing the number of needed connections, cables, etc., which may be at a premium in a densely packed computer rack.

Figure 1:
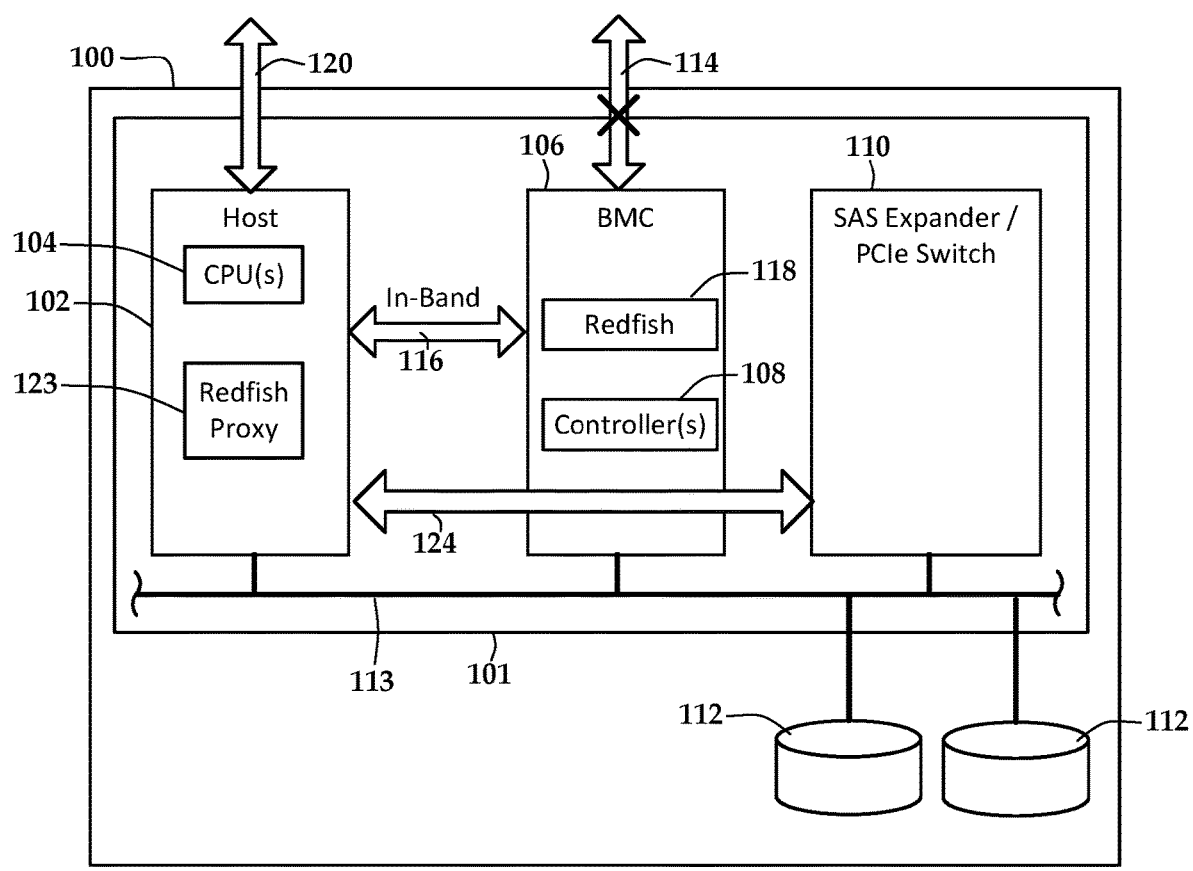
FIG. 1 is a block diagram of a server according to an example embodiment.

In FIG. 1, a block diagram shows a server 100 according to an example embodiment. The server 100 may include a central processing unit (CPU) Complex (host 102), a Baseboard Management Controller (BMC) and an Expander/PCIe Switch having an out-of-band (OOB) IPMI interface, and in-band interfaces for SES/IPMI. Generally, the server includes a host 102 with one more CPUs 104. The host 102 provides high level management of components within the enclosure, e.g., via peripheral input-output (I/O) communications busses 113.

The server 100 also includes a BMC 106 that monitors the state of the server 100 independently of the host 102. The BMC 106 may include one or more microcontrollers 110 embedded on a baseboard/motherboard 101 of the server enclosure and manages the communications between system-management software and platform hardware. The BMC 106 may also be a separate circuit card that plugs into an expansion port on the baseboard 101. An SAS expander/PCIe switch 110 allows increasing the number of peripheral devices (e.g., data storage drives 112) within an enclosure. Generally, the peripheral devices are coupled to one or more busses 113 of the baseboards that facilitate communicating with and host 102. The BMC 106 may also be connected to the bus 113, although may access the peripheral devices via the host 102.

The server 100 may be one of many similar such devices that together form a converged, software-defined data center. A converged, software-defined data center is a data storage facility in which infrastructure elements, such as storage, networking, memory, CPU and security, are virtualized via software and delivered as a service. Deployment, operation, provisioning and configuration are abstracted from hardware and are implemented through system software. This allows dynamic allocation of resources via a management entity making the data center robust and scalable.

With large-scale server designs, the system administrators, while being interested in health of individual server Integrated Object Model (TOM) servers, are also interested in getting an overall view of hardware status of the systems within the entire rack, and even the entire data-center. This status can be sent to an entity external to the enclosures, racks, and or data-center, e.g., to a system monitoring terminal. As a result, standards like Redfish have evolved by which have been designed from the ground up, for simple and secure management of entire computing systems.

Redfish is an open industry standard that is maintained by the Distributed Management Task Force (DMTF). A Redfish agent is an example of a converged, software-defined data center agent. Details of the Redfish standard can be found at www.dmtforg/standards/redfish. Redfish specifies a Representational State Transfer (REST-ful) interface and utilizes JavaScript Object Notation (JSON) and Open Data Protocol (OData) to represent information about a service, system or solution. Redfish provides a consistent API that is scalable and simple to use. Under the Redfish specification, the mechanism for reading or modifying a Redfish resource is via HTTP requests to the resource URI, thus allowing for organizations to develop standardized out-of-band server management solutions. The embodiments described below may be used with other converged, software-defined, data center management agents other than Redfish that are also primarily designed to operation over management network interfaces coupled to the management controller but not via the host.

On conventional systems, the out-of-band network access is achieved by enabling a network interface coupled to the BMC 106, e.g., a management Ethernet port 114 within the TOM that utilizes OOB IPMI over a local area network (LAN). While customers can develop their management methodologies by aggregating data from multiple servers using the out-of-band management port 114, original equipment manufacturer (OEM) vendors are known to keep the management Ethernet port 114 disabled on their systems, and have all management capabilities provided by the in-band methodologies. This does not necessarily affect currently existing models with IPMI since IPMI protocol does provide for an in-band way of interfacing with a management controller and fetching management data over an in-band channel 116, such as a Keyboard Controller Style (KCS) channel. The KCS interface mimics a PC keyboard interface. Other ways of configuring the in-band channel 116 is for the BMC 106 to emulate an optical storage device (e.g., CD-ROM, DVD, Blu-Ray, etc.) over USB.

However, the Redfish standard has not been defined for collecting data via the host through in-band means, and as a result, OEMs who have only in-band means of accessing management data, cannot readily utilize the Redfish methods of accessing data even though the management controller microprocessor 108 is enabled to render Redfish data. Accordingly, the present disclosure describes a way of rendering Redfish data over an in-band interface 116, and thus providing for an way to access standardized Redfish data (and to send control data) even when the management Ethernet port is disabled in production environments and where the server host cannot directly access some of the management data.

In one embodiment, a Redfish agent 118, also referred to herein as a Redfish server, continues to run within the BMC as it would be when the management Ethernet port 114 is enabled and Redfish APIs are directed to the BMC 106. In this case, Redfish API requests are received via network port 120 on the host when the management Ethernet port 114 is disabled, as indicated by the 'x' through the port 114. A peripheral communications channel that exists between the host 102 and the BMC 106 is used as an in-band communications channel for passing Redfish API requests that are received on the host to the BMC. Thus, without any major change in the Redfish Agent monitoring sensors on the BMC 106, Redfish data can be obtained over an in-band communication channel 116, which is also referred to herein as a peripheral communications channel. The BMC 106 may be configured such that the in-band communication channel emulates a network interface, e.g., a USB-coupled network interface. As such, the Redfish agent 118 can operate over the in-band channel 116 with minimal changes.

The host 102 and BMC 106 may activate the peripheral communications channel 116 and proxy server 123 only when needed, e.g., when there is no connection detected on the management Ethernet port 114, via a configuration, etc. In other configurations, the peripheral communications channel 116 and proxy server 123 may operate at all times even if the management Ethernet port 114 is being used.

In this embodiment, the Redfish REST API request is first received by the host 102 via port 120. The request is handled via a Redfish proxy 123 that is coupled to the in-band channel 116. The request gets forwarded to the BMC 106 using in-band channel 116. The BMC 106 processes the request, and returns the result to the Redfish proxy 123 via the in-band channel 116. The Redfish proxy 123 then responds to the request via network port 120.

Figure 2:
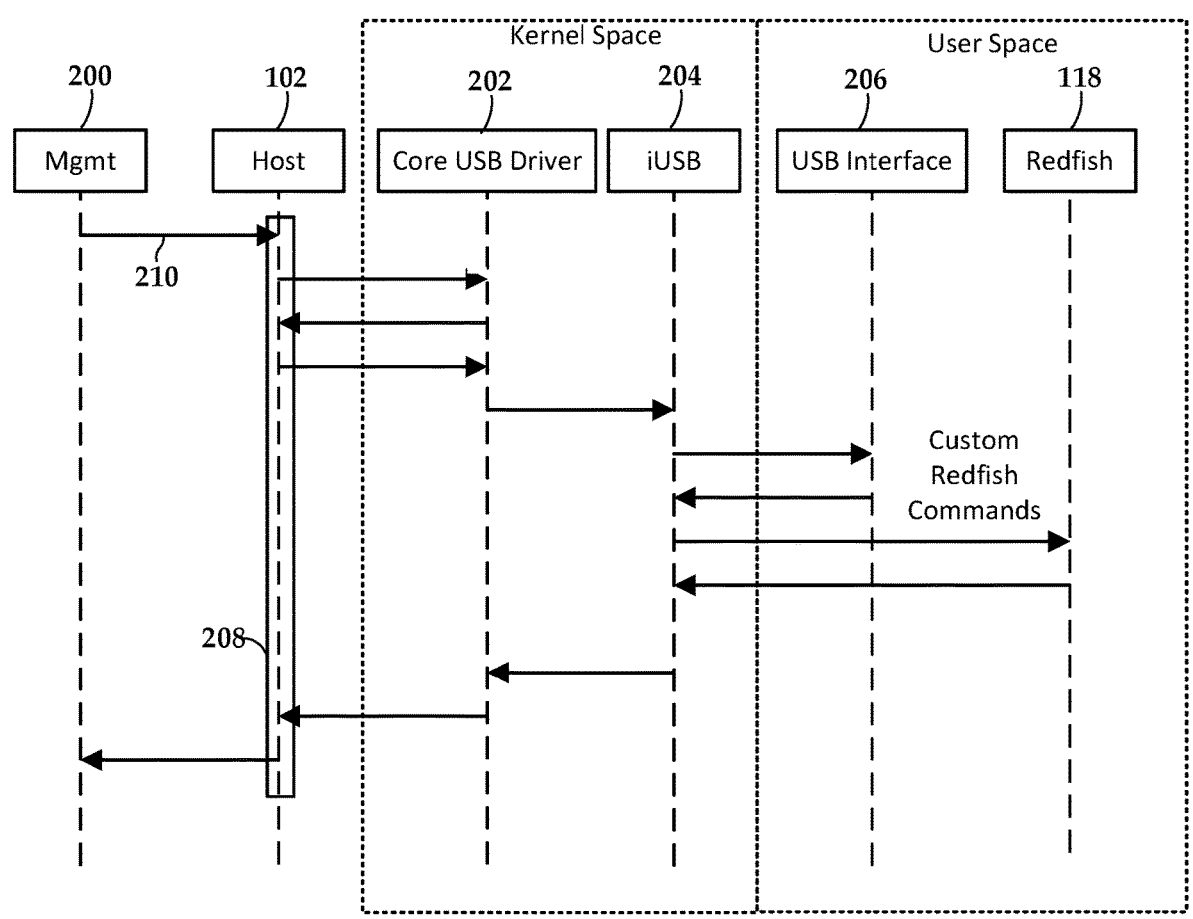
FIG. 2 is a sequence diagram of a showing management controller operations according to an example embodiment.

In FIG. 2, a sequence diagram depicts a flow from the host to the BMC to retrieve Redfish related data according to an example embodiment. A central node management server 200 is responsible for collating data from various individual servers over the Redfish REST API. The server 200 sends out a Redfish API request 210 to the host 102. A proxy server 208 is running within the host 102 and is responsible for decoding the Redfish HTTP headers and query. The proxy server 208 creating a vendor unique iSCSI OEM packet 212 which can be sent across the USB transport, and decoded accordingly by the BMC stack. A generic USB Core driver 202 is responsible for handling all USB related transactions, and passes iSCSI related packets to higher layers for processing. The iUSB Module 204 decodes the packet to identify whether the command received a vendor-specific command, or an interface specific command. The USB interface 206 is responsible for handling generic iSCSI requests like Sense Data commands, etc. The Redfish Agent 118 is a module which waits on the custom-defined Redfish related iSCSI messages, and is responsible for decoding and passing the received request to the Redfish server 118 running on the BMC 106, and sharing the retrieved data back to the host 102 in iSCSI packet format.

Using the mechanism described above, the Redfish implementation on the BMC can be enabled to communicate via the host 102 with minimal firmware changes at the BMC level. The flowcharts in FIGS. 3-6 depict the various logical stages, and checks along the data transaction path from the host 102 to the BMC 106 to retrieve Redfish data according to an example embodiment. Note that in this example, the USB channel emulates a compact disc read-only memory (CD-ROM) device. If an OEM-specific command is found in the emulated CD-ROM data, then this is interpreted as a Redfish management request/query.

Figure 3:
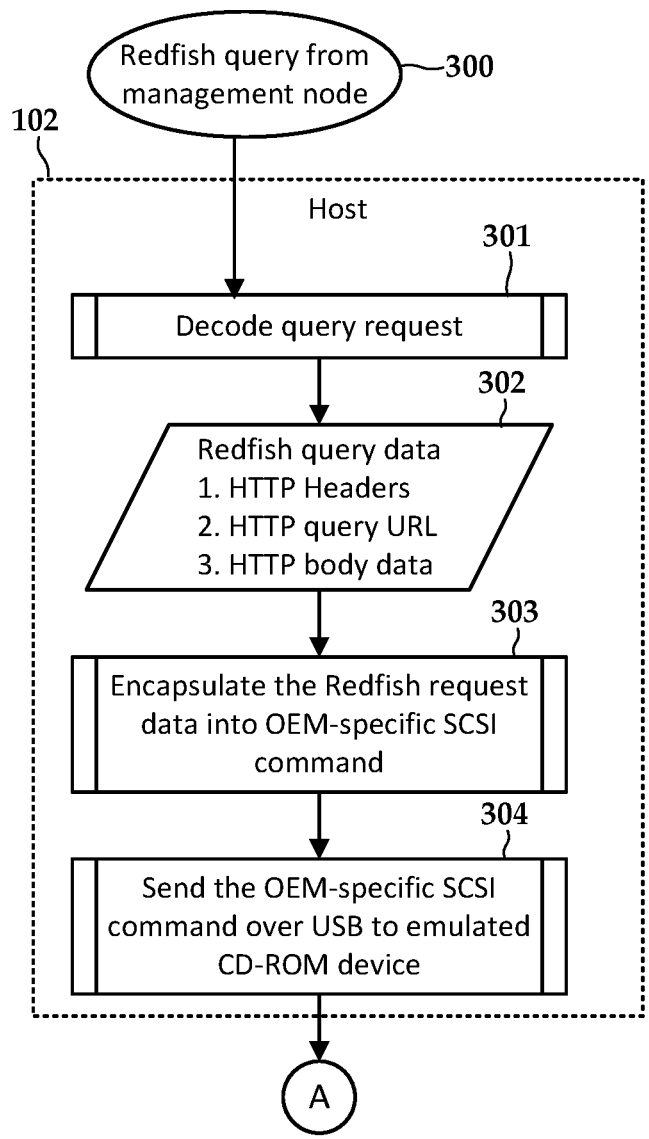
FIGS. 3, 4, 5, and 6 are flowcharts showing management controller operations according to an example embodiment.

As seen in FIG. 3, a Redfish query 300 from a management node is received at the host 102. The request is decoded 301, the decoded data being indicated in block 302. The Redfish request is encapsulated 303 into an OEM-specific SCSI command and sent 304 to the BMC. The BMC operations in response to the query 300 are shown in FIGS. 4 and 5.

Figure 4:
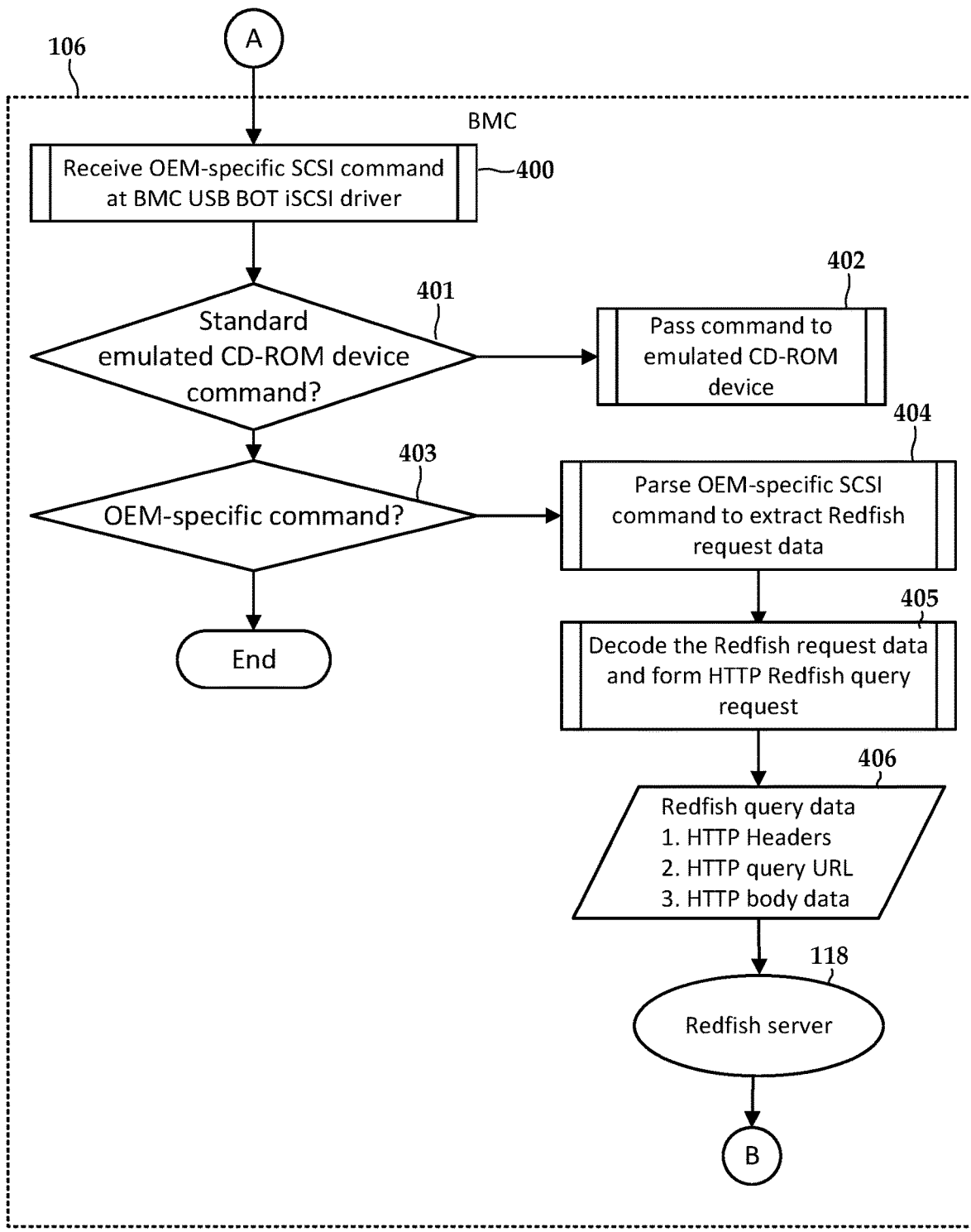

In FIG. 4, the BMC 106 receives 400 the OEM-specific SCSI command using the USB driver and determines 401 if the command is a standard emulated CD-ROM command, e.g., related to emulated CD-ROM data transfers. If so, the command is passed 402 to the emulated CD-ROM device. If the command is not an emulated CD-ROM command, then the BMC 106 determines 403 whether the command is OEM-specific. If the command is a predefined, OEM-specific command, then the command is parsed 404 to extract the Redfish request data, which is decoded 406 to determine the Redfish query data 406. The query data is passed to the Redfish server 118.

Figure 5:
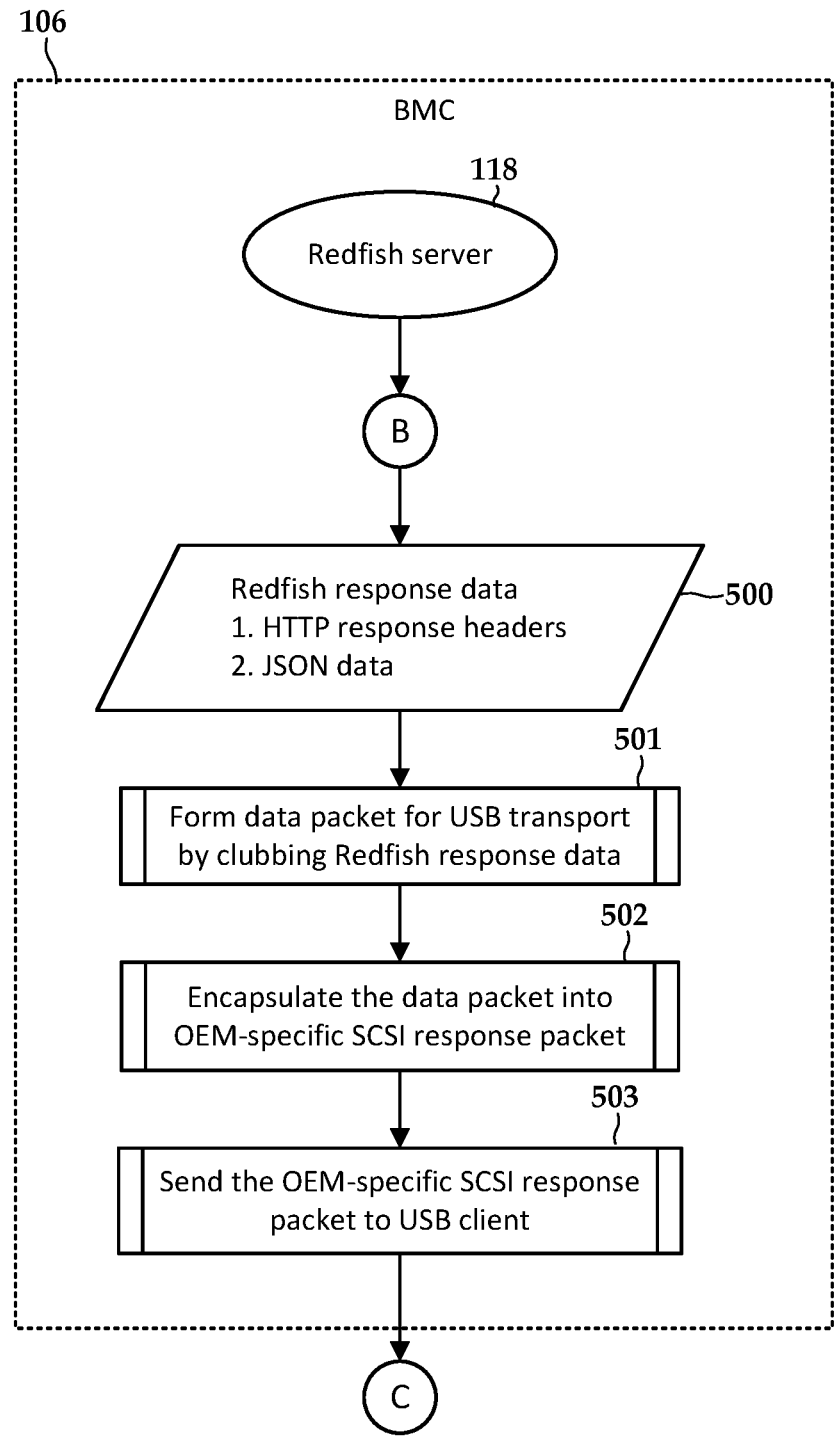
Figure 6:
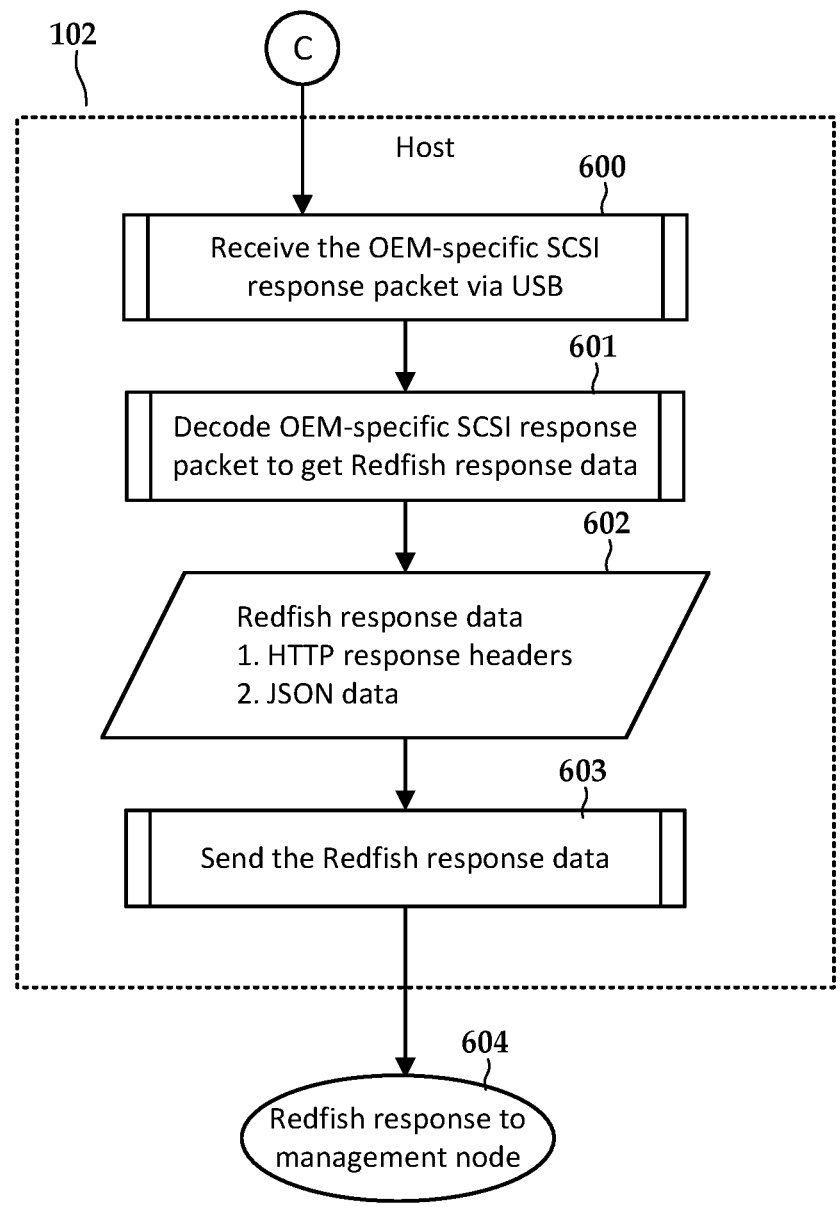

In FIG. 5, the Redfish response data 500 is received from the Redfish server 118 within the BMC 106. The response data 500 is clubbed/packed 501 into a data packet for USB transport, the packed data being encapsulated into an OEM-specific response packet 502. This data packet is then sent 503 via the USB drivers to the host 102, as seen in FIG. 6. In FIG. 6, the host 102 receives 600 the OEM-specific SCSI response packet via USB and decodes 601 the packet to get the Redfish response data 602. The response data 602 is sent 603 as a response to the management node 604.

Figure 7:
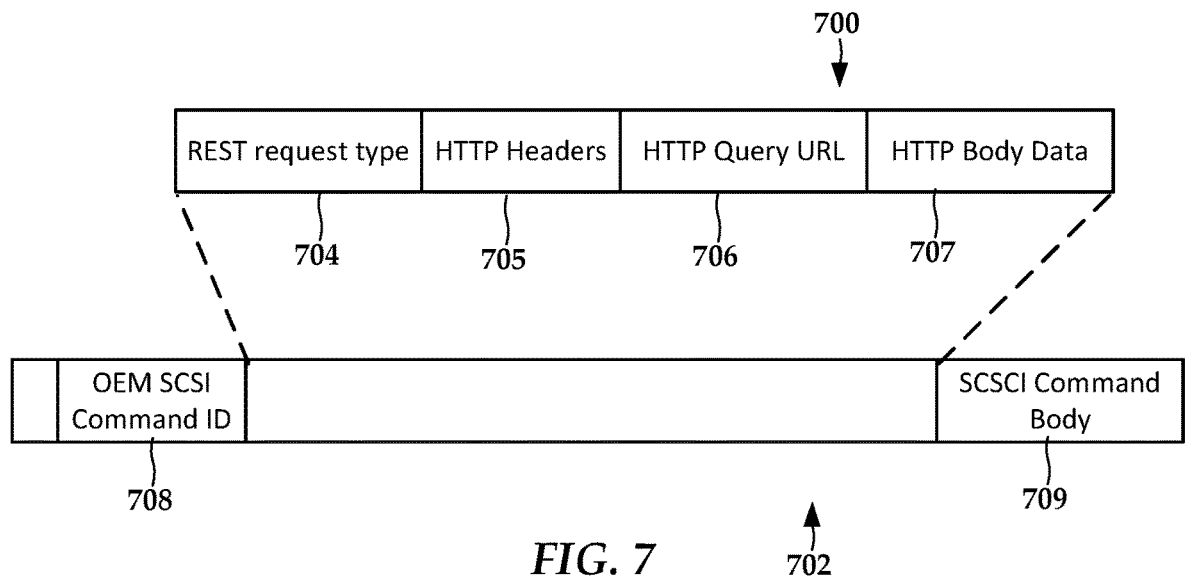
FIGS. 7 and 8 are diagrams showing encapsulation of management data in SCSI packets according to example embodiments.
Figure 8:
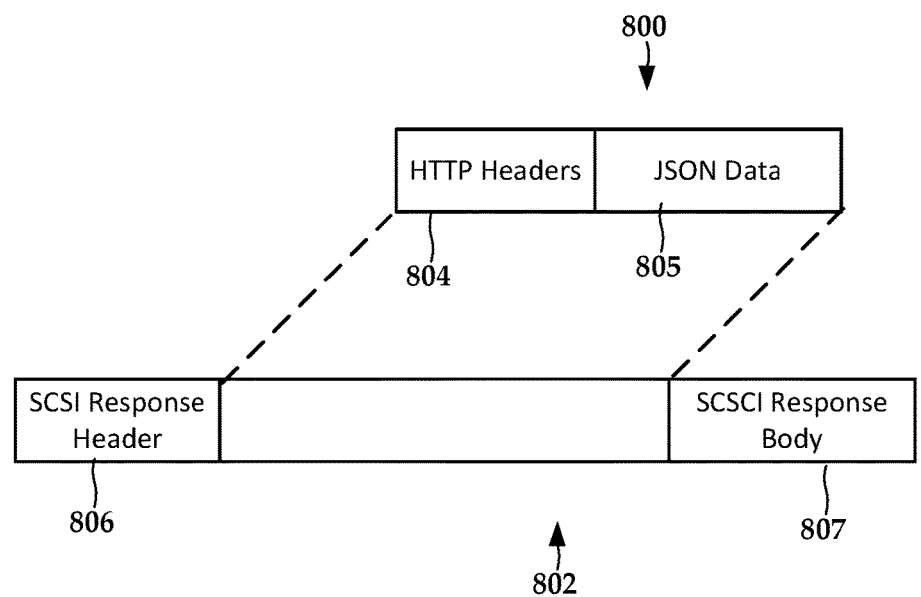

The packet format of data as it is encapsulated and decoded from the SCSI packets is shown in the block diagrams of FIGS. 7 and 8. In FIG. 7, the block diagram shows an example of Redfish query data 700 being encapsulated in an OEM-specific SCSI command message 702. The query data 700 includes REST request type 704, HTTP Headers 706, HTTP Query URL 706, and HTTP Body Data 707. The query data 700 is located between an OEM SCSI Command ID 708 and SCSI Command Body 709 in the message 702.

In FIG. 8, the block diagram shows an example of Redfish response data 800 being encapsulated in an OEM-specific SCSI response message 802. The response data 800 includes HTTP Headers 804 and JSON Data 805. The query data 800 is located between SCSI Response Header field 806 and SCSI Response Body 807 in the message 802.

In the embodiments described herein, a Redfish server can be used to query system parameters from a server, as well as setting configurations on the server. In some embodiments, it may be desired to provide the ability to remotely query and update storage server firmware, such as basic input-output system (BIOS), unified extensible firmware interface (UEFI), etc. Currently vendors provide a setup program for viewing and changing BIOS or UEFI settings. Accessing this setup program requires pressing of some a particular key combination during system boot. The user then has the option to manually read/alter the existing settings.

Using a boot-time setup program, archiving of previous set BIOS settings is not possible. Therefore, to determine which parameter caused a fault to occur becomes difficult in case the BIOS fails to boot after doing any alteration using BIOS setup utility. To change any setting, the operating system has to be halted, which is time consuming. In a large-scale installation, the manual intervention needed to make changes via a boot-time setup program can be difficult. Accordingly, a system and method is described that allows remotely configuring BIOS settings. This can be done over standardized OOB Interface using the Redfish OOB standard. A generic Redfish schema can be defined for maintaining BIOS configuration data.

Figure 9:
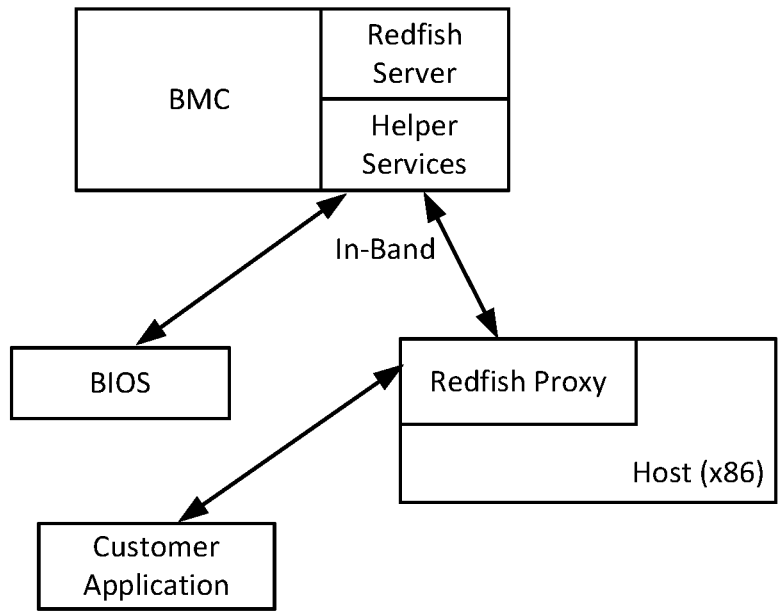
FIG. 9 is a diagram showing an architecture for firmware updates according to an example embodiment.

The scheme mentioned below will have BMC acting as a custodian of all the BIOS settings stored in a database having a predefined schema. The customer can read and/or modify these firm settings by interacting with the Redfish server using standardized RESTful application program interfaces (API's). As shown in the block diagram of FIG. 9, this solution is designed to perform the read/update of a portion or all of the BIOS setup settings contained within a BIOS setup using the Redfish Framework.

The Redfish Framework specifies a RESTful interface and utilizes JSON and OData to represent information about the BIOS settings. The same is achieved by extending the Redfish Plugins to have a BIOS service that performs such read/write operations on an archived database of BIOS settings. In today's cloud- and web-based data center infrastructures, scalability is often achieved through large quantities of simple servers. This hyper-scale usage model is drastically different than that of traditional enterprise platforms, and requires a new approach to management.

Redfish is an open industry standard that meets scalability requirements in multi-vendor deployments, and integrates easily with commonly used tools by specifying a RESTful interface and utilizing JSON and OData. Other than meeting the scalability requirements additional advantage of having Redfish arises from the usage of RESTful protocols are much quicker to learn than SOAP. They have the simplicity of being a data pattern (as REST is not strictly a protocol) mapped to HTTP operations directly.

Figure 10:
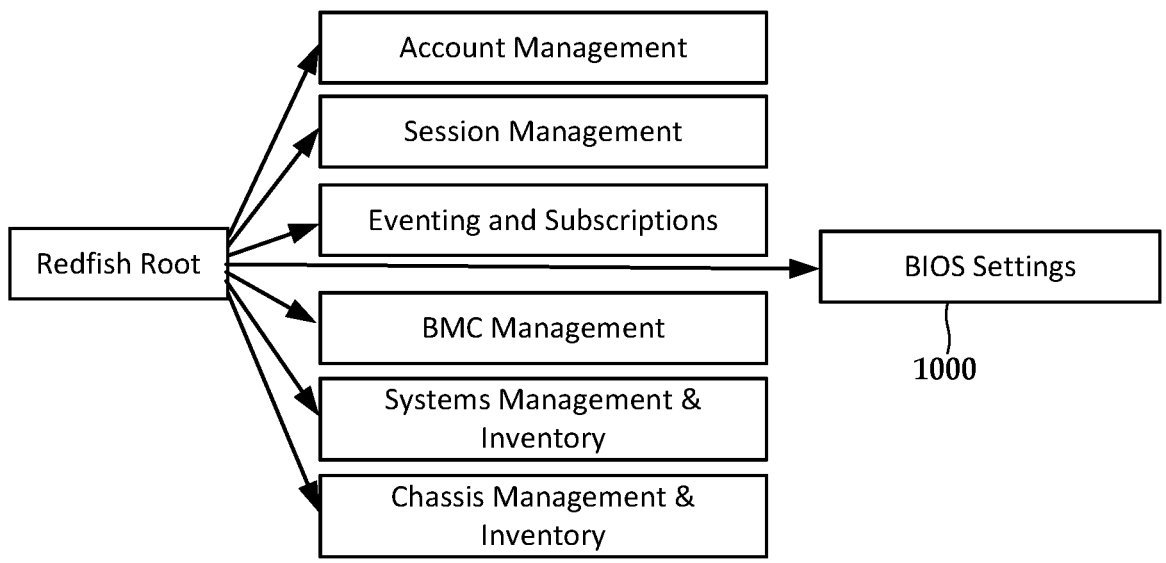
FIG. 10 is a diagram showing a firmware update plugin as part of a management controller architecture according to an example embodiment.

The JSON is fast becoming the modern data format. It is inherently human readable, more concise than XML, has a plethora of modern language support and is the most rapidly growing data format for web service APIs. In Redfish, a collection represents a group of similar resources. Examples include Systems, Managers and Chassis. as seen in FIG. 10. A BIOS Settings plugin 1000 can be added over existing conventional Redfish plugins In the proposed solution, the Redfish Plugins are extended to have a BIOS service that performs such read/write operations on an archived Database using a predefined schema related to BIOS settings. This provides the ability to change BIOS settings over out-of-band mediums like from the network interface of the host in the server platform as some of the original equipment manufacturer (OEM) vendors are known to keep the management Ethernet port disabled on their systems. The BIOS settings can be edited through archives, e.g., ordered data structures that allow comparison between versions and can be validated via a hash or other means. This solution can provide verification that BIOS settings have not been tampered with at OS start of day.

The Redfish BIOS plugin can provide the capability to selectively expose variables, allowing some variables can be hidden as opposed to other existing tools. The plugin can be extended to automatically detect the presence of Default/Custom BIOS settings on the BMC store and restore them when system detects newly flashed BIOS.

This solution can be integrated into any framework using Redfish. Representing the data in JSON format is suitable for embedded manageability environments. Most BMCs already support a web server and manage a server through a browser is common (typically via a Java script-driven interface). By utilizing JSON, the data from the BIOS Settings service is viewed directly in the browser, ensuring the data and the programmatic interface is uniform in semantics and value.

The Redfish BIOS plugin prevents the need for having a separate client-server by having it within the Redfish framework hence improving maintainability. The plugin provides a customer-centric solution for editing BIOS settings, and added advantage of maintainability and flexibility of representing the data in JSON, which could easily be integrated into the end customer frameworks as its integrated into the latest Redfish Management Framework.

Figure 11:
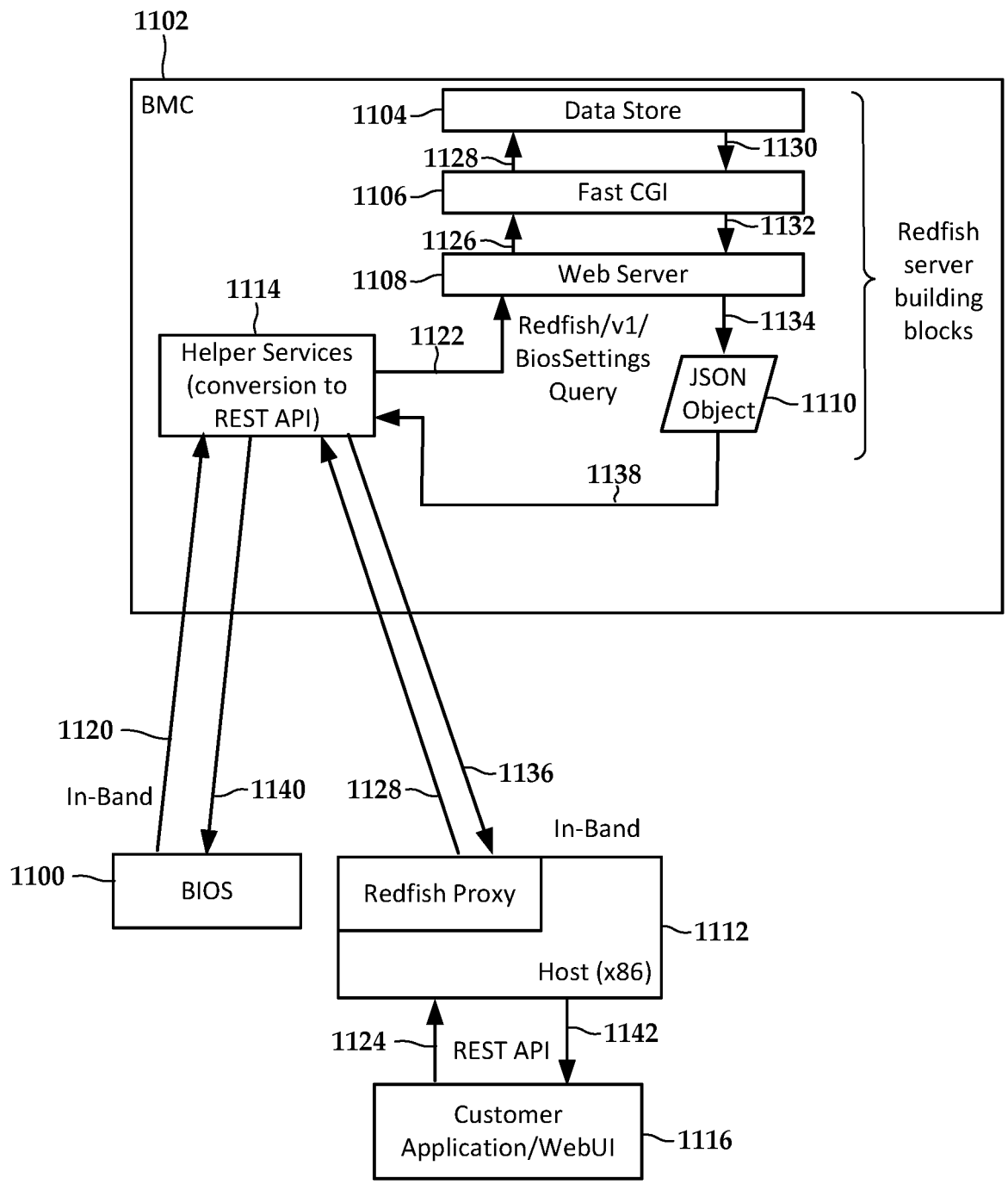
FIG. 11 is a block diagram of a management controller configured for firmware updates according to an example embodiment.

For storage servers, currently the only interface available to change the various BIOS settings is the BIOS setup utility via a keyboard and monitor user interface. This involves pressing of a predefined key during BIOS boot to enter the BIOS setup utility. The user then has the option to manually read/alter the existing settings. Providing this data in JSON provides the flexibility to integrate the BIOS data into customer frameworks. In FIG. 11, a diagram shows the building blocks of the proposed solution together with request/response flow path using RedFish. The application server components include the BIOS 1100. The BIOS component 1100 may be extended include other firmware components of the host and/or chassis, e.g., peripheral card firmware, storage device firmware, user settings and configurations. The BIOS component 1100 may operate independently of the BIOS setup utility noted above.

The BMC includes the following Redfish elements: Data Store 1104, Fast CGI Interface 1106, Web Server 1108 (which forms the Building blocks of the Redfish server running on the Management Controller), Helper Services 1114, JSON Object 1110 and the Host server 1112. In one embodiment, the BIOS 1100 would pass a BIOS variable to the BMC 1102. This could be done using in-band mediums such as KCS/USB or BMC scratch pad interface on to the BMC 1102. The BIOS variable would be received by a Helper service 1114 which convert the same to a REST API Bios Settings data object and POST this request to the Redfish server. The received request is then parsed by the Web Server 1108 and the Fast CGI protocol 1106. The BIOS variable data received would be stored in the Data Store, based on pre-defined schema. In this way, the BMC becomes the store house of the information.

The schema format for each BIOS variable could be as defined as represented by the example the code listing in FIG. 12. The data base schema can have additional information per variable to identify if the variable was modified using the JSON object 1110 or The Host in the server 1112 so that it could be pulled in BIOS in next boot. The Data Store 1104 may also store generic BIOS information which will describe, e.g., protection status, total count of BIOS variables, number of modified variables, etc., as shown in the code listing of FIG. 13. The above could be performed for all BIOS variables at start of day.

The stored BIOS variables can be fetched from the BMC for archiving via paths 1130, 1132, 1134, 1138, 1136, and 1142. This uses a REST API over the Redfish framework on the BMC 1102 using a GET request. In response to this request, all the BIOS settings may be received as a JSON object and archived. The above received BIOS settings could be edited and posted back into the Data Store 1104 on the BMC from the host server 1112, via paths 1124, 1128, 1122, 1226, and 1128, thereby allowing the editing of BIOS settings via a management terminal. The BIOS settings may be pulled by the BIOS via paths 1130, 1132, 1134, 1138, and 1140 by issuing a GET request. In this way, the modified variables could be reflected in the BIOS at the next reboot.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

What is claimed is:

1. An apparatus comprising:
   a baseboard that physically couples a baseboard management controller and a central processing unit (CPU) of a host, the baseboard management controller monitoring the host and operating independently of the CPU, the baseboard management controller comprising a management Ethernet port separate from a host network port of the host and operating a management agent configured to receive external requests from a management server via the management Ethernet port and send management data describing status of the host in response thereto to the management server via the management Ethernet port; and
   a non-Ethernet, peripheral communications channel coupled between a proxy server of the host and the management agent of the baseboard management controller, the proxy server coupled to receive the external requests via the host network port from the management server, the peripheral communications channel configured to communicate the external requests and the management data between the management server and the management agent via the host network port and proxy server instead of the management Ethernet port.

2. The apparatus of claim 1, wherein the management agent comprises a converged, software-defined data center agent.

3. The apparatus of claim 1, wherein the peripheral communications channel comprises a universal serial bus (USB) channel.

4. The apparatus of claim 3, wherein the USB channel emulates an optical read-only memory device.

5. The apparatus of claim 1, wherein the peripheral communications channel emulates a keyboard controller style channel.

6. The apparatus of claim 1, wherein the host and the baseboard management controller are configured to detect that the management Ethernet port is not being used, and to activate the peripheral communications channel and the proxy server in response thereto.

7. The apparatus of claim 1, wherein the peripheral communications channel and the proxy server are operable at all times even if the management Ethernet port is being used.

8. The apparatus of claim 1, wherein the management data also describes status of data storage drives coupled to the host.

9. The apparatus of claim 1, wherein the external requests are encapsulated into SCSI packets via the host and decoded from the SCSI packets via the management agent.

10. The apparatus of claim 1, wherein the management data is encapsulated into SCSI packets via the management agent and decoded from the SCSI packets via the host.

11. The apparatus of claim 1, wherein the host cannot directly access at least some of the management data.

12. A method comprising:
    receiving an out-of-band request from a management server via a host network port of a host operable on an apparatus, the apparatus comprising a baseboard physically coupling a central processing unit (CPU) of the host and a baseboard management controller that monitors the host and operates independently of the CPU, the baseboard management controller a management Ethernet port separate from the host network port, the baseboard management controller configured to receive external requests via the management Ethernet port and send management data describing status of peripheral devices and the host in response thereto;

sending, via a non-Ethernet peripheral communications channel from a proxy server of the host, the out-of-band request to a management agent running on the baseboard management controller, the management agent configured to receive the external request and respond to the request via the host network port instead of the management Ethernet port;

formatting the management data via the management agent and sending the management data to the proxy server via the peripheral communications channel, the management data describing hardware status that is obtained via the baseboard management controller in response to the out-of-band request; and sending the management data from the host network port to the management server in response to the out-of-band request.

13. The method of claim 12, wherein the management agent comprises a Redfish agent.

14. The method of claim 12, wherein the peripheral communications channel comprises one of a universal serial bus (USB) channel and a keyboard controller style channel.

15. The method of claim 12, further comprising:
detecting that the management Ethernet port is not being used; and
activating the peripheral communications channel and the proxy server in response thereto.

16. The method of claim 12, further comprising:
encapsulating the external requests into SCSI packets via the host; and
decoding the external requests from the SCSI packets via the management agent.

17. The method of claim 12, further comprising:
encapsulating the management data into SCSI packets via the management agent; and
decoding the management data from the SCSI packets via the host.

18. A system comprising:
a baseboard physically coupled to a central processing unit (CPU) of a host and a baseboard management controller operating independently of the CPU, the baseboard management controller comprising a management Ethernet port separate from the host network port, the host and the baseboard management controller operable to communicate with each other via a non-Ethernet peripheral communications channel of the baseboard, the baseboard operable to:
in response to the host receiving an out-of-band request from a management server via a host network port, receive, via the peripheral communications channel instead of the management Ethernet port, the out-of-band request at a management agent running on the baseboard management controller;
format management data via the management agent and send the management data to the host via the peripheral communications channel instead of the management Ethernet port, the management data describing hardware status that is obtained via the baseboard management controller in response to the out-of-band request, the management data sent from the host network port to the management server in response to the out-of-band request; and
apply a modified firmware setting to the host via the management agent prior to a boot of the host, the application of the modified firmware setting being independent of a firmware setup utility accessed via a user interface, the firmware being one of a basic input-output system (BIOS) and a unified extensible firmware interface (UEFI) of the host.

19. The system of claim 18, further comprising receiving the modified firmware setting at the host via the out-of-band request.

20. The system of claim 18, wherein the modified firmware setting is applied via a firmware plugin to the management agent, the management agent comprising a RedFish agent, the modified firmware setting being stored on a database of the management controller.

* * * * *